United States Patent
Skarakis (10) Patent No.: US 10,368,129 B2
(45) Date of Patent: *Jul. 30, 2019

(54) METHOD OF PROCESSING VIDEO DATA, DEVICE, COMPUTER PROGRAM PRODUCT, AND DATA CONSTRUCT

(71) Applicant: Unify GmbH & Co. KG, Munich (DE)

(72) Inventor: Konstantinos Skarakis, Athens (GR)

(73) Assignee: Unify GmbH & Co. KG, Munich (DE)

( * ) Notice: Subject to any disclaimer, the term of this patent is extended or adjusted under 35 U.S.C. 154(b) by 391 days.

This patent is subject to a terminal disclaimer.

(21) Appl. No.: 15/292,484

(22) Filed: Oct. 13, 2016

(65) Prior Publication Data

US 2017/0034580 A1    Feb. 2, 2017

Related U.S. Application Data

(63) Continuation of application No. 14/382,004, filed as application No. PCT/EP2012/005111 on Dec. 11, 2012, now Pat. No. 9,501,702.

(51) Int. Cl.
*H04N 9/80* (2006.01)
*G11B 27/00* (2006.01)
(Continued)

(52) U.S. Cl.
CPC ..... *H04N 21/4542* (2013.01); *G06K 9/00335* (2013.01); *G06K 9/00342* (2013.01);
(Continued)

(58) Field of Classification Search
USPC ........ 386/261, 262, 278, 280, 300, 239, 248
See application file for complete search history.

(56) References Cited

U.S. PATENT DOCUMENTS

| | | | | |
|---|---|---|---|---|
| 8,756,641 B2* | 6/2014 | Ivanov | ............... | H04N 21/4524 |
| | | | | 725/110 |
| 8,813,193 B2* | 8/2014 | Kim | ........................ | H04L 63/10 |
| | | | | 726/27 |
| 2011/0161999 A1* | 6/2011 | Klappert | ............ | H04N 21/4307 |
| | | | | 725/25 |

FOREIGN PATENT DOCUMENTS

WO    2009144330 A1    12/2009

OTHER PUBLICATIONS

Written Opinion of the International Searching Authority for PCT/EP20121005111 dated Jul. 5, 2013 (Form PCT/ISA/237).
(Continued)

*Primary Examiner* — Daquan Zhao
(74) *Attorney, Agent, or Firm* — Buchanan Ingersoll & Rooney PC (57) ABSTRACT

The invention relates to a method of processing video data, a device (102) and a computer program product for implementing said method, and a data construct including video data processed by said method. The method processes unprocessed video data into processed video data, said unprocessed video data being provided by picking up (112) sequential images of a situation or scene (100), and includes the steps of: applying a motion and gesture recognition technology (114) in real time to said situation or scene; identifying undesirable image contents contained in said unprocessed video data, based on a result of said motion and gesture recognition, said undesirable image contents preferably including inappropriate body expression (128-132) such as obscene gestures or indecent exposures, and providing content information relating to any identified undesirable age contents; and using said content information to produce said processed video data.

20 Claims, 7 Drawing Sheets

(51) Int. Cl.
  *H04N 21/454* (2011.01)
  *G06K 9/00* (2006.01)
  *H04N 21/4545* (2011.01)
  *H04N 21/84* (2011.01)
  *G11B 27/031* (2006.01)
  *H04N 7/15* (2006.01)
  *H04N 9/70* (2006.01)

(52) U.S. Cl.
  CPC ..... *G06K 9/00355* (2013.01); *G06K 9/00718* (2013.01); *G06K 9/00765* (2013.01); *G11B 27/031* (2013.01); *H04N 7/15* (2013.01); *H04N 21/45455* (2013.01); *H04N 21/84* (2013.01)

(56) References Cited

OTHER PUBLICATIONS

International Search Report for PCT/EP2012/005111 dated Jul. 5, 2013 (Forms PCT/ISA/220, PCT/ISA/210).
Endeshaw, Tadilo, et al., "Classification of Indecent Videos by Low Complexity Repetitive Motion Detection" Applied Imagery Pattern Recognition Workshop, 2008, pp. 1-7.
Rea, N., "Multimodal Periodicity Analysis for Illicit Content Detection in Videos" Internet Citation, Nov. 29, 2006.

* cited by examiner

METHOD OF PROCESSING VIDEO DATA, DEVICE, COMPUTER PROGRAM PRODUCT, AND DATA CONSTRUCT

CROSS-REFERENCE TO RELATED APPLICATIONS

This application is a continuation application of U.S. patent application Ser. No. 14/382,004, which is the U.S. national stage under 35 U.S.C. § 371 of PCT International Application No. PCT/EP2012/005111, filed on Dec. 11, 2012.

The invention relates to a method of processing video data, a device and a computer program product for implementing said method, and a data construct including video data.

In video conferencing applications, it is not provided for the content being reviewed and if necessary filtered or censored before it reaches the other side. In business communication, such filtering is seldom (if ever) needed since the content is not widely broadcast and also in most cases the conferencing parties consist of adults that are not in need of protection. However, there are cases where one might work from home and their family or children might be in the room, which case it would be favorable to have these children be protected from obscene gestures or indecent exposure which might be contained in a video conference.

The same problem may occur in everyday video calls where a child may be party of communication with an adult or only casual bystander of communication between adults, such as video telephony or internet video chatting. (It is, of course, to be noted problem is likewise relevant if an underage person uses an obscene gesture or indecent exposure in front of another minor.)

A similar problem relates to live television broadcasts. In a live television broadcast environment, it is not known in advance how participants of a television show like talkshow, reality show, sports event or the like, will behave. Hence, obscene gestures or indecent exposure might be shown in consumer's homes' television screens without a possibility of such undesired body expressions being filtered so as to protect minors from being confronted with such contents.

It is therefore a need for protecting consumers of video contents such as participants of real-time video communication or live television broadcast from undesirable image contents such as obscene gestures or indecent exposures.

In the field of video production and distribution, protection of underage target groups is a regular task (the term "video" is used herein as a synonym for any moving image contents, be it movie, documentation, live event, music video or whatsoever). Censoring cuts for avoiding inappropriate contents for a particular age requires considerable workforce. If a video is cut, the contents are fixed and cannot be changed. Therefore, parental guidance is limited for parents to discuss inappropriate contents, or stop watching a video together with their children, or hiding their eyes at upsetting scenes.

The detection of motions of body, limbs, fingers, or eyes of a person for controlling computer applications such as computer games is known in the art. Motion controllers have been developed and, partly, marketed under different brands. Atari's historical Mindlink (unreleased), as described in http://www.atarimuseum.com/videogames/consoles/2600/mindlink.html, uses a headband which "would detect read resistance the myoneural signal voltage to muscles in the users forehead (or elsewhere) and interpret them into commands on the screen, using the analog/digital game port interface" (sic!). Nintendo's Wii console is described on http://en.wikipedia.org/wiki/Wii_Remote to use accelerometer and infrared optical sensors for detecting body motion. According to http://en.wikipedia.org/wiki/Kinect, Microsoft's Kinect sensor is designed to track the movement of objects and individuals in three dimensions by use of an infrared projector and camera and a special microchip. Therein, the Kinect sensors a horizontal bar connected to a small base with a motorized pivot and is designed to be positioned lengthwise above or below a video display. The device features an RGB camera, depth sensor and multi-array microphone running software, so as to provide full-body 3D motion capture, facial recognition and voice recognition capabilities. The depth sensor consists of an infrared laser projector combined with a monochrome CMOS sensor, which captures video data in 3D under any ambient light conditions. The sensing range of the depth sensor is adjustable, and the software is capable of automatically calibrating the sensor based on gameplay and the player's physical environment, accommodating for the presence of furniture or other obstacles. The microphone array provides for acoustic source localization and ambient noise suppression, allowing, for example, for headset-free party chat or the like. It is possible to simultaneously track a number of persons. Even though the Kinect sensor originally was designed for controlling an XBox 360 platform, numerous applications have been developed independently for game control, robot control, security, fashion, medical imaging, and others. As for videoconferencing, adaption of the Kinect sensor for 3D teleconferencing has been proposed by Oliver Keylos of UC Davis, as reported in Casey Newton, "Microsoft's Xbox Kinect beyond hackers, hobbyists", San Francisco Chronicle, Jan. 10, 2011, available under http://www.sfgate/com/cgi-bin/article.cgi?f=/c/a/2011/01/10/BUO01H4ISI.DTL&ao=all. It is noted that the terms Atari, Mindlink, Nintendo, Wii, Microsoft, XBox, and Kinect may be subject of trademark and/or trade name protection.

An object of the present invention is to protect consumers of video contents such as participants of real-time video communication, watchers of live television broadcast, or users of recorded video from undesirable image contents such as obscene gestures or indecent exposures.

A further object of the invention is to facilitate and automate censoring cuts in video production.

A further object of the invention is to provide an opportunity for watchers or consumers of video contents to chose whether a censored or an uncensored version of said contents are seen at his or her side.

At least one of the above objects is solved by the features of the independent claims. Further developments and embodiments of the invention are set forth in the subclaims.

A basic idea of the present invention is to use Kinect or similar motion and gesture recognition techniques for real-time interpreting gestures of participants of a scene provided in video communication or TV broadcasting or a distributed video product, so as to detect undesirable image contents stemming from inappropriate body expressions such as obscene gestures or indecent exposures of said participants, and suppress or make suppressible such undesired content in resulting video data.

According to a first aspect of the invention, a method of processing video data is provided, said method processing unprocessed video data into processed video data, said unprocessed video data being provided by picking up sequential image frames of a situation or scene, and said method including:

applying a motion and gesture recognition technology in real time to said situation or scene;

identifying undesirable image contents contained in said unprocessed video data, based on a result of said motion and gesture recognition, said undesirable image contents preferably including inappropriate body expression such as obscene gestures or indecent exposures, and providing content information relating to any identified undesirable image contents; and using said content information to produce said processed video data.

As is known in the art, video data may be capture (picked-up) and transmitted or recorded as a sequence of still images called frames which, serially looked on in a suitable frequency, result in a reception of a continuously moving scene. It will be noted that said sequential images may be provided by any camera such as a TV camera, a webcam, an integrated camera of a cell phone, smart phone, tablet pc or the like, a cine camera whatsoever. A situation or scene in the sense of the present invention any part of the physical world being subject to video capture. In particular, a situation or scene may be part of a TV studio, an open air live event, a teleconferencing or video telephony environment, a film set, an occasional street scene, or the like. Applying the technique in real time means that application is performed at the time of video capture. Using said content information enables video censoring in live communication, streaming, or broadcasting, and also enhances detection of contents to be censored in recordable video data.

According to a preferred embodiment of the invention, the method includes the steps of:

scanning said situation or scene by a sensor device within a scanning field thereof;

identifying persons in said scanning field; and deciding whether or not one of a person in said scanning field is performing an inappropriate body expression, based on said recognized motions and gestures.

A motion and gesture recognition technology may be provided, e.g., by a sensor unit like a Kinect sensor. However, other sensor devices may be used as well. It will be noted that a scanning field of the sensor device at least covers an imaging field of an imaging device such as a camera or the like, providing said unprocessed video data. Said decision may be accomplished by comparing parameters acquired by said sensor device with predefined parameters stored in said database, said predefined parameters describing predefined gestures and/or movements which are understood to be obscene or indecent. The predefined parameters may be easily adapted to legal provisions and/or social consensus and/or industrial policy.

According to a further preferred embodiment of the invention, said identified undesired contents are suppressed in said processed video data, using said content information. By suppressing undesired contents, addressees of video contents may be efficiently protected.

According to a further preferred embodiment of the invention, said content information includes area information on image areas (or sections) including said identified undesired contents, and said suppressing step may include making said image areas unrecognizable in a frame, based on said area information. As is well-known in the art, each frame consists of a number of image lines which number depends from technical standard. In digital video, each frame is defined by a number of image lines and a number of image columns which means that each dot of an image can be referenced by its coordinates in terms of line number and column number. It is possible to define an image section or area by its coordinates, e.g., opposing corners or one corner and width and height of a rectangle or square, a center and radius or diameter of a circle, or the like. Therefore, area information can be generated including coordinates of an area (or section) of a video frame in which said undesirable image contents are found in said frame. Known techniques for king areas unrecognizable are, e.g., garbling, pixelating, blurring, shading, replacing by colored or white bars, dots or other geometrical figures, if transmitted or broadcast in real time, undesired contents will not reach the addressee or receiver so that the addressee will not be bothered by such contents.

Alternatively, said suppressing step may include dropping a frame having said identified undesired contents (infected frame, in the following) from being included in said processed video data at all. This method may make it easier to prepare recordings of a live situation for underaged target groups by placing censoring cuts while avoiding the necessity of each frame to be thoroughly watched by a human person. Instead of dropping a frame, a most recent frame with no undesired contents may be repeated, or frames having undesired contents may just be replaced by a blank screen. Thereby, audible contents may remain uninterruptedly synchronized with image contents which would be preferable, e.g., in live talkshows, music performances or sport commentaries, and real-time transmission is also possible.

According to an alternative preferred embodiment of the invention, said content information is included in a data region such as a header or surplus lines of each video frame, or is included in a data stream apart from a video stream. In other words, transmitted or recorded video data may include any contents uncensored while censoring information (content information) is additionally encoded in said video frame or a data stream provided in parallel to said video stream. Thereby, suppressing undesired contents may be left to an instance apart from the motion and gesture recognition instance. For example, suppressing may be left to a device on the receiver's side of a communication or broadcast, and may also be provided as an optional function use of which is left to the discretion of a person operating such device. It is as well possible that processed video data having said content information included in a data region of each frame is forwarded to writing on a storage medium (i.e., not in real time in this case), e.g., on a video tape, DVD, BlueRay disk or hard disk, or in downloaded or streamed video data, and said content information is interpreted by a video player, DVD player, Blue Ray player or computer of the watcher. Thereby, e.g., parents may decide to watch a DVD with all contents displayed when they watch alone, but to enable a suppressing function of the respective player device when their children watch with them, or when they leave their children alone.

Said content information may include a flag indicating that undesirable image contents are contained in said frame. Instead of or in addition to said flag, an area counter may by be provided in said frame header, including a number of identified areas in said frame. In addition or alternatively to an area counter, an end-of-areas flag may be included indicating that said area information is finished. Such flags or counters can reduce processing load by allowing a data interpreter to jump to an image data region of a frame, or to cease interpreting censoring data stream for a frame if said flag or counter indicates that no (more) area to be suppressed is contained in that frame.

Said content information may also include a continue information indicating that undesirable image contents known of a previous frame continue to be present in a presently processed frame. This continue indication may be just a flag, and/or may include an indication that an area known of a previous frame continues to contain said undesirable image contents in a presently processed frame. If a continue flag is true, coordinates of respective area information may be differential coordinates indicating a change in location and/or size of a respective area in respect of said previous frame. These measures can also reduce processing bad and enhance processing efficiency and speed.

According to a preferred embodiment of the invention, said method includes:

identifying indicators in said situation or scene which increase the likelihood of undesirable image contents to be contained in said unprocessed video data in the future, based on recognized motions and gestures, and providing an information on said indicators; and adapting said motion and gesture recognition by using information on said identified indicators.

Identification of said indicators may include comparing parameters acquired by a sensor device with parameters stored in a database (which may be the same as the previously described database or different therefrom), said parameters describing predefined alerting gestures and/or movements which bear a raised potential that a person is going to perform inappropriate body expressions. Said adapting step preferably includes setting an alert state in which a scanning rate of a scanning device is increased and/or a scanning resolution is increased, at least in an image section in which an obscene gesture or indecent exposure is expected, and/or a data processing cycle for motion and gesture recognition is accelerated.

In many situations it is unlikely that undesired body expressions are shown by participants. However, the likelihood of undesired body expressions to be shown may be judged to be increased when certain motion patters are exhibited which may be used as an indicator in the sense of this invention. By this embodiment, a motion and gesture recognition facility may be set into an alerting mode when such indicators are identified. In this alerting mode, e.g., a scanning rate and/or resolution may be enhanced, or a processing cycle may be enhanced, or processing may be focused on certain regions where undesired body expressions are expected, which enables an instance executing the method of this invention to reduce processing load under no-alert conditions.

According to second aspect of the invention, a method of processing video data is provided, said method processing unprocessed video data into processed video data, and including:

reading a data region of said unprocessed video data;
judging whether undesired image contents are contained in said unprocessed video data, by detecting and interpreting content information contained in said data region; and
suppressing said undesired image contents in said processed video data, based on said content information.

This aspect of the invention relates to a two-stage censoring process with a first stage just detecting undesirable contents and providing information thereon, and the second stage actually suppressing said undesirable contents. The second stage may be implemented on a sending side and may relate to any instance in or apart from a motion and gesture recognition instance, which may distribute processing load between, e.g., a Kinect sensor and a computer. The second stage may also be implemented on a receiving side of a real-time communication or broadcast, e.g., at any instance reading video data from a data stream or data carrier. It is to be noted that the phrases "unprocessed" and "processed" are used from the point of view of a method or process actually performed. Thus, video data may be seen as unprocessed video data in respect of the method identifying the presence of undesired contents by means of information contained in data regions included in video data, but may be seen as processed data in respect of a previous-stage method which identifies said undesirable contents by means of motion and gesture recognition, and writes said information into said data regions. It will furthermore be noted that said suppression may be accomplished by any method described before. In particular, said suppression may include the use of area information, for hiding selected areas (or image sections) where undesirable image contents found.

According to another aspect of the invention, a method of performing real-time video communication is provided, said method including a video data processing method as above. A real-time communication in the sense of the invention is any communication which reaches a receiving party, without the need of being stored on and/or exchanged on a physical (or material) storage medium or carrier. A real-time video communication in particular may be a video conference, a video telephony call an internet video chat, a television broadcast, or the like.

According to another aspect of the invention, a method of recording video data is provided, said method including a video data processing method as above.

The invention further aspects thereof also relates to a video data processing device, a communication device, respectively being adapted to implement a method as described above, a computer program product comprising code means being adapted to implement a method as described above, and a data construct including video data processed by a method as described above.

It will be noted that a device may be designed with any functional elements integrated, or to be a distributed device with its functional elements distributed across several single devices like a computer, a sensor device, an imaging device, or others. Said video data processing device or communication device may include, integratediy or distributedly:

image pick-up means for picking up sequential images of a situation or scene;
motion and gesture recognition means;
undesirable contents identification means for identifying undesirable image contents contained in said unprocessed video data, based on recognized motions and gestures;
content information providing means for providing content information on undesirable contents identified; and
video data producing means for producing said processed video data by using said contents information.

Furthermore, said video data processing device or communication device may include, integratedly or distributedly, selected ones of:

area identification means for identifying areas in which undesirable image contents are contained in said unprocessed video data, based on recognized motions and gestures, and area information providing means for providing area information on said areas identified;
sensor device for scanning said situation or scene in its scanning field, person identification means for identifying persons in said scanning field, and deciding means for deciding whether or not one of said persons in said imaging area is performing an obscene gesture or indecent exposure, based on said recognized motions and gestures;

database means for storing predefined parameters as data sets, said predefined parameters describing predefined gestures and/or movements which are understood to be obscene or indecent, parameter comparing means for comparing parameters acquired by said sensor device with said predefined parameters stored in said database;

contents suppressing means for suppressing undesired contents in said processed video data, using said contents information;

data adding means for adding or including said contents information in a data region such as a header or surplus lines of each video frame, or in a data stream apart from a video stream;

indicator identifying means for identifying indicators in said situation or scene which increase the likelihood of undesirable image contents to be contained in said unprocessed video data in the future, based on detected motions and recognized patterns, and providing an information on said indications, and adapting means for adapting said sensor device by using information on said identified indicators, said adapting means preferably including alert state setting means for setting an alert state in which a scanning rate of said scanning device is increased and/or a scanning resolution is increased, at least in an region in which an obscene gesture or indecent exposure is expected;

second database means for storing predefined parameters as data said predefined parameters describing predefined alerting gestures and/or movements which bear a raised potential that a person is going to perform an obscene gesture or indecent exposure, and second parameter comparing means for comparing parameters acquired by said sensor device with said predefined parameters stored in said second database means;

data transmitting means for transmitting said processed data to a receiving side.

Said video data processing device or communication device may additionally or alternatively include, integratedly or distributedly:

data reading means for reading a data region of said unprocessed video data;

undesirable contents identifying means for detecting and interpreting information contained in said data region, thereby identifying undesirable image contents contained in said unprocessed video data; and suppressing means for suppressing undesirable image contents in said processed video data.

Said video data processing device or communication device may additionally or alternatively include, integratedly or distributedly, display means for displaying said processed video data;

selection means for selecting a suppression mode, said suppression mode indicating whether and/or to which grade suppression of undesired contents shall be applied.

Preferably, a Kinect sensor device is used as a sensor device of the invention. The Kinect sensor device or other devices of this type are used in videogames which requires a very fast, almost real time translation of video stream or image into information about a subject's movement or position. Therefore, the motion and pattern detection capabilities of such devices can be advantageously utilised to identify undesired contents such as obscene gestures or indecent exposure.

Said code means may be a data stream or volatilely or unvolatilely stored data, and may be stored on or included in a data carrier, be it material or immaterial. A data construct in the sense of the invention may be a data stream or volatilely or unvolatilely stored data, and may be stored on or included in a data carrier, be it material or immaterial. Examples for material data carriers may be magnetic tape, digital versatile disk (DVD), Blue Ray disk, magnetic disk, diskette or floppy disk, memory stick, hard disk drive (HDD), and the like. Examples for immaterial data carriers may be a radio frequency, telecommunications line, internet connection or the like.

Further aspects, embodiments, objects and advantages the present invention will become apparent by the following description of exemplary embodiments with reference to the accompanying drawings, wherein.

Figure 1:
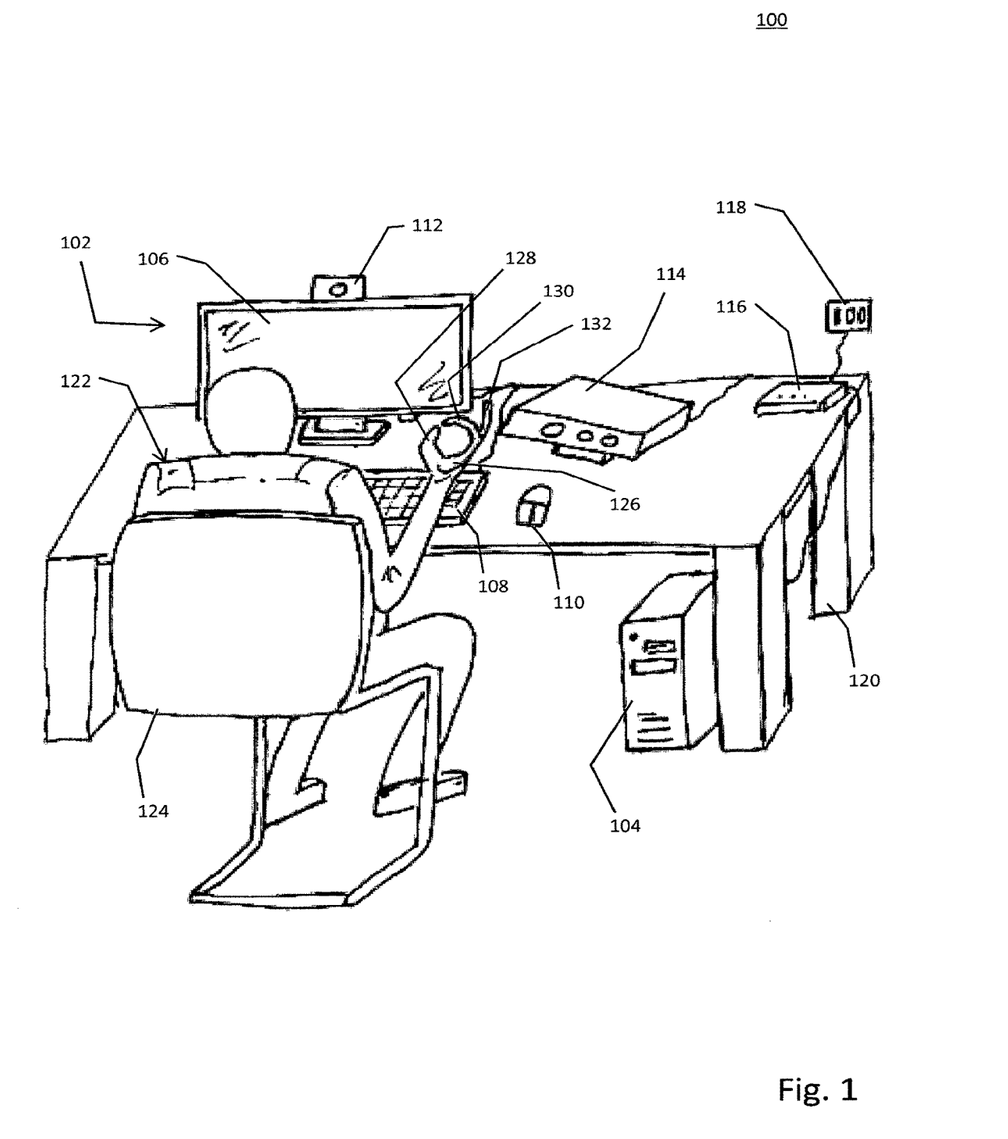
FIG. 1 schematically shows a situation with a telecommunications setup according to a preferred embodiment.

FIG. 1 schematically shows a situation 100 with a telecommunications setup 102 according to a preferred embodiment exemplifying the present invention. Telecommunications setup 102 includes a computer workstation 104, a monitor 106, a keyboard 108, a computer mouse 110, a webcam 112, a sensor device 114, and a router 116. Workstation 104, monitor 106, keyboard 108, computer mouse 110, and webcam 112 may be of any kind. In the present embodiment, webcam 112 is installed on top of monitor 104. Monitor 106, keyboard 108, computer mouse 110, webcam 112, and sensor device 114 are connected with workstation 104. It will be noted that computer mouse 110 in this embodiment is a wireless mouse. Workstation 104 is further connected to router 116 which in turn is connected to a wall socket 118 providing connection to a wide network like the internet (not shown). Monitor 106, keyboard 108, computer mouse 110, webcam 112 and sensor device 114 are placed on a desk 120 while workstation 104 is located underneath the desk 120. It is to be noted that monitor 106, webcam 112 and/or sensor device 114 may also be placed otherwise, such as on a wall. Although not shown, a headset or microphone and speakers are provided to be used for acoustic communication, and connected to workstation 104.

Workstation 104 includes a computer core having a CPU, ROM, RAM, internal bus, as well as peripherals and network interfaces (not shown) in usual manner. Sensor device 114 according to this preferred embodiment is a Kinect device as marketed by the Microsoft Corporation. In particular, sensor device 114 includes an infrared laser detector, a monochrome CMOS sensor, an RGB camera and a multi-array microphone which are integrated parts not shown in the figure.

A person 122 is sitting on a chair 124 in front of desk 120. In the situation 100 shown in the figure person 122 is involved in a video conference established by said telecommunications setup 102, and is watching the conference on monitor 106 while an image of him or herself is captured by webcam 112 and forwarded, through a teleconferencing software installed in workstation 106, to other attendees of the video conference. Establishing and performing a video conference is known in the art so that description thereof can be omitted here. Sensor device 114 is positioned so that person 122 is within its scanning field (or scanning range). It is noted that the scanning field of sensor device 114 at least covers an image capturing field of webcam 112.

Sensor device 114 is equipped with a motion and gesture recognition function output of which is fed into a gesture and exposure filtering function which is implemented with workstation 104 and which cooperates with a teleconferencing function thereof. It will be noted that the mentioned functions may be implemented by software and/or hardware. In particular, gesture and exposure filtering function is implemented so as to filter obscene gestures and indecent exposures from the video data stream coming from webcam 112.

As seen in FIG. 1, person 122 has raised a right hand 126 and is actually forming an "O" gesture with a thumb 128 and forefinger 130 while the other fingers 132 are uncurled. It is to be noted that this "O" gesture which is well known as an "OK" sign in some cultures like in the U.S.A. or Germany may also be understood as an insult in other cultures like in Italy. Furthermore, this gesture may also prepare for another gesture with the forefinger of the other hand penetrating that "O" (not shown), which would be likely to raise disgust in most cultures. In the following, it will be described how gestures are treated.

Figure 2:
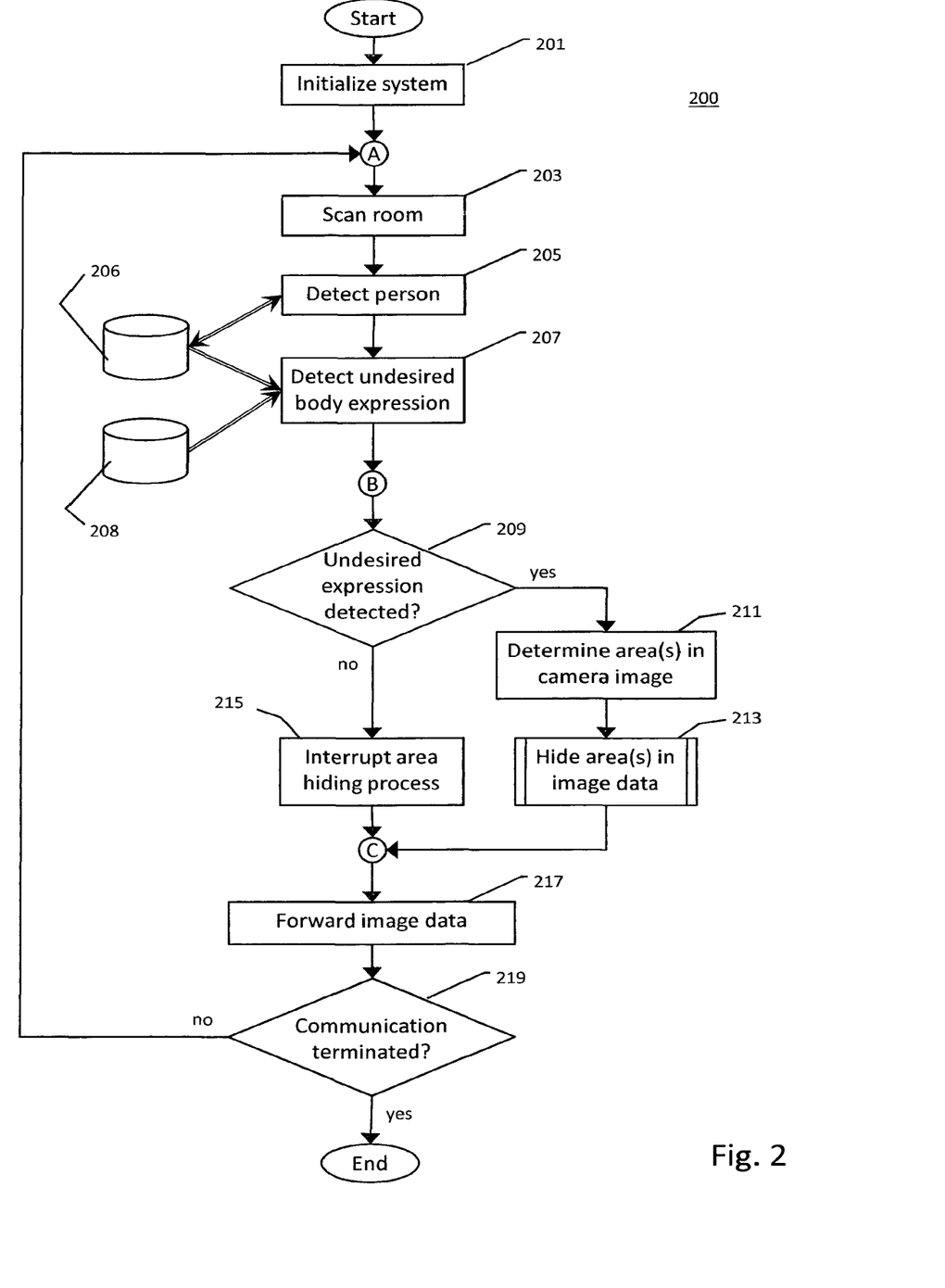
FIG. 2 shows a flow chart schematically illustrating a process according to further preferred embodiment.

FIG. 2 shows a flow chart schematically illustrating a process 200 according to a further preferred embodiment exemplifying the present invention. This process 200 makes use of the telecommunications setup 102 shown in FIG. 1.

After starting the process 200, the system is initialized in step 201. That initialization includes that the sensor device 114 and webcam 112 (for parts of the setup, see FIG. 1) is energized and started, a sensor software is started as well as a motion and gesture recognition software, a database (to be described later) is made accessible, a teleconferencing software to display conference frames on display 106, relative positions of webcam 112 and sensor device 114 are determined, based on image data from webcam 112 and the RGB camera as well as sensor data from the CCD sensor in sensor device 114, and a communication with a third party is set up through workstation 104 and router 116. Then, the process continues to a virtual point "A" leading to step 203, it is to noted that virtual point "A" is a starting point of a main loop of process 200.

In step 203, a room is scanned by scanning device 114. Scanning includes sending infrared laser signals into a scanned room, receiving reflected laser signals through a CMOS sensor, and receiving image signals through the RGB camera integrated in scanning device 114. Then, the process continues to step 205.

In step 205, a person (here, person 122) is detected. Detecting a person includes interpreting signals of scanning device 114 so as to decide whether the signals belong to a person, a furniture or other obstacle, assigning a identifier to each person, furniture or obstacle, storing location and motion parameters of each item in an item database which is symbolised by reference number 206 in FIG. 2, and tracing each item in the course of time (i.e., through several cycles of process 200). Tracing in this context includes deciding, for each item, whether it was previously detected, and if so, assigning it the same item identifier as detected before, and if no, assigning it a new item identifier. The assignment of location and motion parameters is done to a scale of body parts such as head chest, belly, hip, arms, legs, hands, fingers, and the like, and said parameters include information about parts being covered by textiles or other obstacles and parts being visibly exposed of a person. Then, the process continues to step 207 via virtual point "B". It is to be noted that virtual point "B" has no procedural meaning but is used as a reference point below.

In step 207, undesired body expressions of any identified person are detected (or recognised). Detecting undesired body expressions of a person includes comparing location and motion parameters of a person with parameters permanently stored in an undesired expressions database symbolised by reference number 208 in FIG. 2. Undesired expressions database 208 contains location and motion parameters both momentary and progressive, which have been determined to represent, e.g., obscene gestures and indecent exposure a person may show, and stored in advance. In other words, detecting undesired body expressions in step 207 can be described as a pattern recognition wherein location and motion parameters of a person are compared with predetermined patterns stored in undesired expressions database 208. Then, the process continues to step 209.

In step 209, it is judged whether or not undesired expressions have been identified, based on the result of the detection in step 207. If the judgement step 209 is affirmative, the process goes to step 211, otherwise to step 215 be described later.

In step 211 following step 209 in the affirmative case, an area or several areas is/are determined which contain undesired body expressions as detected in step 207, in an image taken from webcam 112. It is to be noted that, as the relative positions of webcam 112 and sensor device 114 are known from the initialization process in step 201, location parameters stemming from the undesired expressions detecting step 207 are easily transformed into image coordinates in an image stemming from webcam 112. Then, the process continues to step 213.

In step 213, areas determined in step 211 are hidden in image data coming from webcam 112. Step 213 is a subroutine which is executed, for each image frame coming from webcam 112, until the routine shown in FIG. 2 comes to this point again with new areas returned from step 211 or to step 215 to be described later. The hiding of areas will be further described below in context with FIG. 4. It will be noted that image data coming from webcam 112 is unprocessed image data in the sense of the invention while image data having passed the main loop of process 200 is processed data in the sense of the invention, be it changed by step 213 or not. Then, the process continues to virtual point "C" to unify with the negative branch of step 209.

In step 215 following step 209 in the negative case, which means that the process yields no areas returned from step 211, any running subroutine of hiding areas in image data (step 213) is interrupted. For ease of illustration, a judgment and branching as to whether said subroutine is running or not is understood to be included in step 215. Then, the process continues to virtual point "C" further leading to step 217.

In step 217, processed image data is forwarded. It will be noted that image data corning from webcam 112 may be referred to as unprocessed image data while image data being treated as described above may be referred to as processed image data, in the sense of the invention. Forwarding processed image data includes preparing each frame, with or without hidden areas, for use by the video conferencing software, and sent, via router 116 (FIG. 1) to another side of communication. Then, the process continues to step 219.

In step 219, it is judged whether or not communication has ended, be it by the user (person 122) or another side of communication or the system due to technical reasons. If the decision is affirmative, the process ends. Otherwise, the process jumps back to the beginning of the main loop of process 200 at virtual point "A".

It is to be noted that webcam 112 according to the present embodiment is run by the telecommunications software, in parallel to control of the sensor device 114 by the sensor software. The gesture recognition software may be part of the telecommunications software or the sensor software. However, distribution of the process implementation across workstation 104, sensor device 114, and router 116 may be designed as needed.

Figure 3:
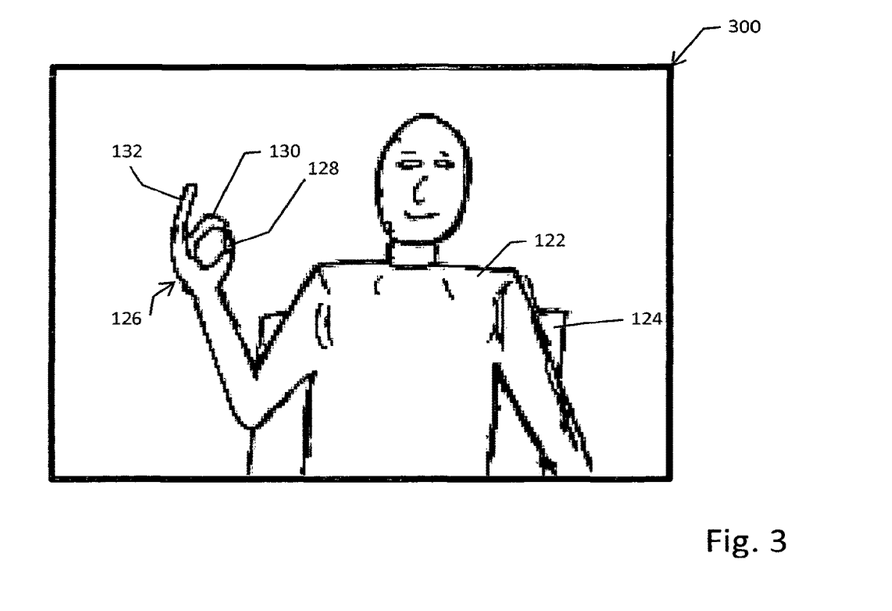
FIG. 3 schematically shows a video exemplifying unprocessed video data.

FIG. 3 schematically shows a frame 300 coming from webcam 112. Person 122 can be seen to sit on chair 124, raising his or her hand 126 and making the "O" gesture as described above, with thumb 128 and fingers 130, 132. Frame 300 be referred to as unprocessed video data in the sense of the invention.

Figure 4:
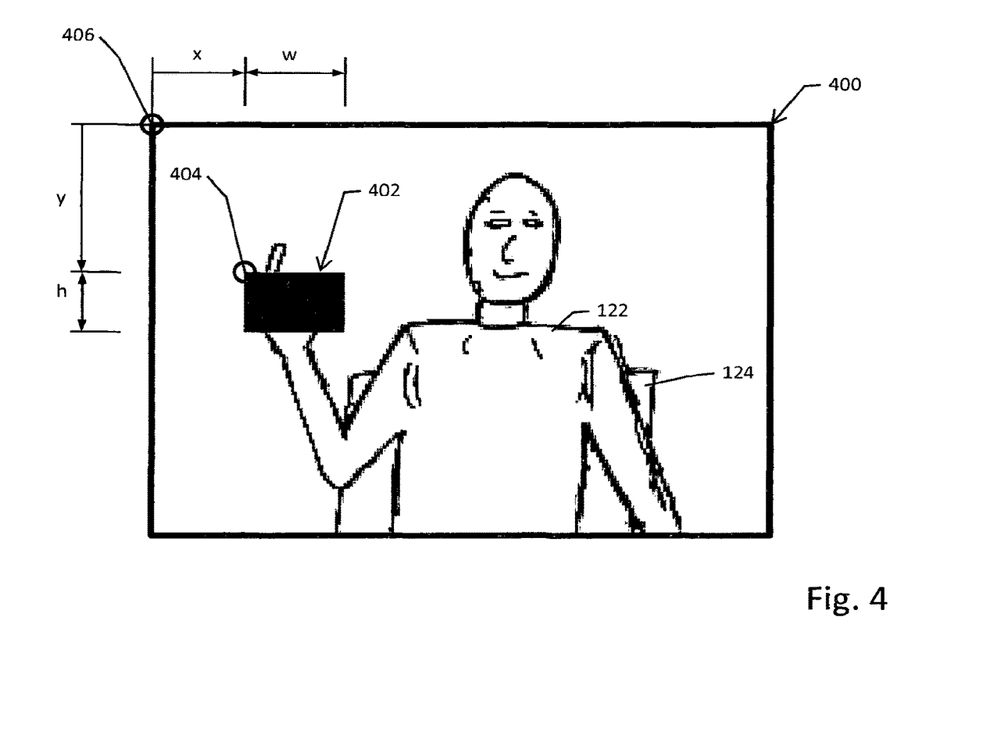
FIG. 4 schematically shows a video frame exemplifying processed video data.

FIG. 4 schematically shows a frame 400 resulting from frame 300 (FIG. 3) in the case that the process 200 illustrated in FIG. 2 and described above has detected the "O" gesture as undesirable expression. This may be the case if a participant of the video conference is located in Italy where the "O" gesture is understood as a rude insult.

As seen in FIG. 4, image contents of frame 400 are identical with that of frame 300 except an area 402 which replaces a part of frame 300 (FIG. 3) containing the hand of person 122. Area 402 is defined by coordinates x, y of its left upper corner 404, its width w, and its height h. Coordinates x, y are measured in terms of row number and line number of frame 400 counted from an origin 406 or left upper corner of frame 400.

Frame 400 may be referred as processed video data in the sense of the present invention. However, it should be noted that, if process 200 (FIG. 2) would not have detected the "O" gesture as an undesired body expression and have let pass frame 300 unchanged, such frame would also be referred to as processed data in the sense of the invention as it has undergone the detection and judgement process in FIG. 2.

In the present embodiment, hiding is accomplished through replacement by a black rectangle. It is to be noted that the rectangle may have any other color, and that any other suitable geometrical figures such as circles, ellipses, dots, or the like, may be used as needed. The process may provide other kind of hiding, such as any kind of garbling like, e.g., pixelating, blurring, shading, or making unrecognizable in any way. Any such measure of hiding can be addressed as suppressing in the sense of the invention.

Figure 5:
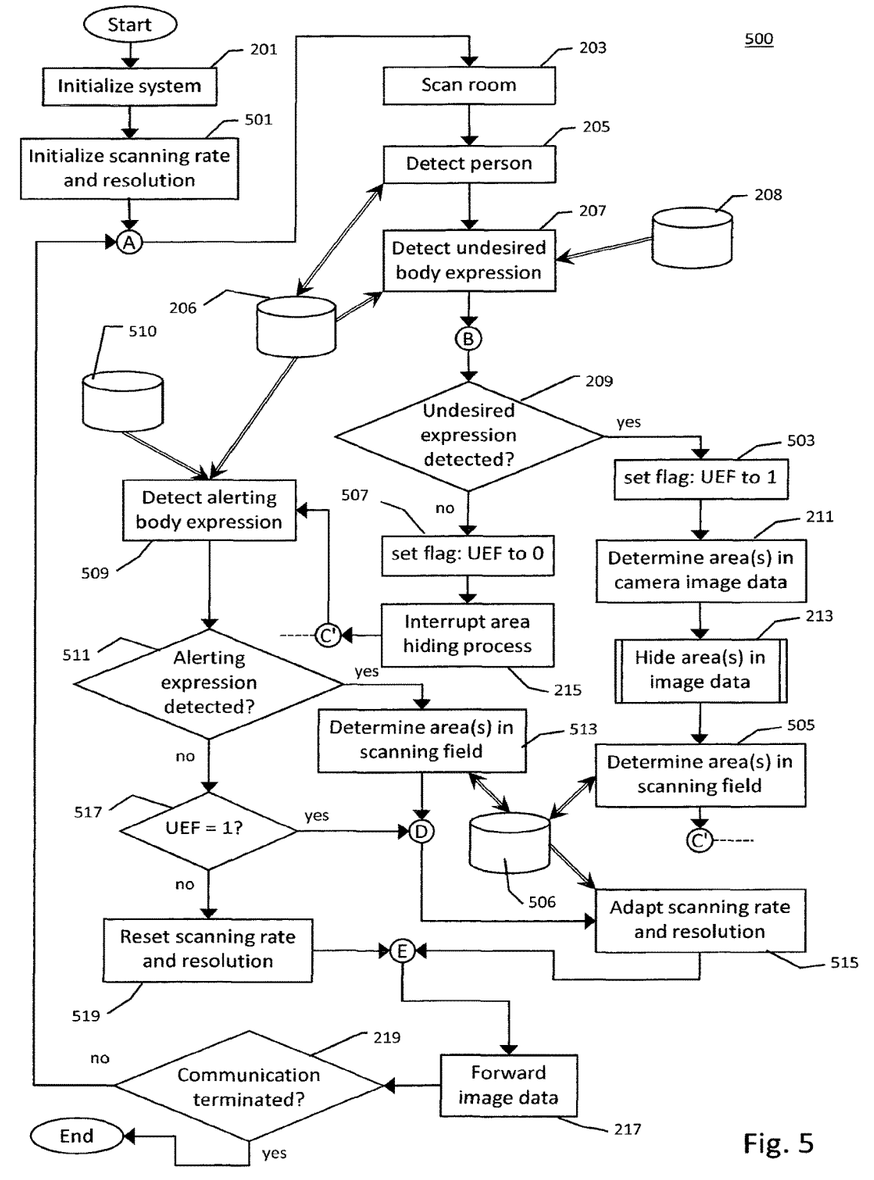
FIG. 5 shows a flow chart schematically illustrating another process according to a further preferred embodiment.

FIG. 5 shows a flow chart illustrating a process 500 according to another preferred embodiment exemplifying the invention.

In this embodiment, use is made of the fact that, other than active gamin applications for which, e.g. the Kinect or other sensor devices have been developed, the present application may allow for reduced scanning rate and/or resolution. However, it may be that a situation requires closer look and/or shorter response time than usual in a video conferencing situation so that, in the present embodiment, scanning rate and resolution of sensor device 114 (FIG. 1) are designed to be adaptable.

The process 500 has steps in common with the process 200 shown in FIG. 2 which are indicated by the same reference numbers. Description of such common steps is omitted or shortened below.

As above, process 500 begins with step 201 initalising the system.

Step 201 is followed by step 501 initializing canning rate and scanning resolution of sensor device 114. This means that scanning rate and scanning resolution of sensor device 114 are set to an initial value lower than a maximum scanning rate and resolution thereof. Then the process continues to virtual point "A".

From virtual point "A", the process executes steps 203 through 209, scanning the room, detecting person(s) and undesired expressions by use of item database 206 and undesired expressions database 208, and judging whether or not undesired expressions have been detected. If the judgment in step 209 is affirmative, the process continues to step 503, otherwise to step 507 to be described later.

In step 503 following step 209 in the affirmative case, an undesired expressions flag UEF is set to a value of 1 representing a logical value of true. Follow steps 211 and 213 as above, determining and hiding image area(s) in image data stemming from webcam 112 (see FIG. 1). Then, the procedure continues to step 505.

Step 505 determines an area or several areas in the scanning field of sensor device 505 where undesired expression(s) has/have been detected. It is to be noted that those areas are still known as knowledge thereof is used to determine areas in the camera image date in step 211. The determination in step 505 means that information of detected areas is made available for further use, e.g., by storing field coordinates of such areas in the form of a database, here database 506. Then, the process continues to virtual point "C'".

In step 507 following step 209 in the negative case, undesired expressions flag UEF is set to a value of 0 representing a logical value of false. Then, the process continues to step 215 already known to interrupt a possibly running area hiding process (step 213). Thereafter, the process continues to virtual point "C'" to unify with the affirmative branch of step 209.

Following virtual point "C'", the process continues step 509.

Step 509 detects (or recognizes)alerting body expressions of any identified person. Detecting alerting body expressions in step 509 includes comparing location and motion parameters of a person with parameters permanently stored in an alerting expressions database symbolised by reference number 510 in FIG. 5. Alerting expressions database 510 contains location and motion parameters, both momentary and progressive, which have been determined to be prone for leading to undesired expressions a person may show, and stored in advance. Alerting expressions may include, e.g., a person raising a hand, standing up, jumping up, moving a hand toward his or her crotch, beginning to undress, and others. Like for undesired expression detecting step 207 of process 200 shown in FIG. 2, detecting alerting body expressions in step 509 can be described as a pattern recognition wherein location and motion parameters of a person are compared with predetermined patterns. Then, the process continues to step 511.

In step 511, a judgement is made whether or not alerting expressions have been identified, based on the result of the detection in step 509. If the judgement in step 511 is affirmative, the process continues to step 513, otherwise to step 517 to be described later.

In step 513 following step 511 in be affirmative case, an areas or several areas is/are determined which contain(s) alerting body expressions as detected in step 509, in a scanning field of sensor device 114. Determining in step 513 includes writing coordinates of the detected areas into the same database 506 as used in step 505. This means that database 506 includes both areas in which alerting expressions are detected as well as areas in which actually undesired expressions are detected. It is to be noted that the determination in steps 505 and 513 includes comparing determined areas with areas already stored in that database, and adding, altering, or deleting contents thereof as needed. Following step 513 the process continues to step 515 via virtual point "D" to unify with the affirmative branch of step 511.

In step 515, scanning rate and resolution of sensor device 114 are adapted. The adapting in step 515 includes setting the scanning rate of sensor device 114 to an increased value. The adapting in step 515 furthermore includes setting the scanning resolution of sensor device 114 to an increase value, in said determined areas. Adjusting the scanning resolution may relate to the laser projector, the CCD sensor, or the evaluation of sensor signals. By adapting the scanning rate and resolution to higher values, a possible escalation of a communication may be monitored with higher alertness. Then, the process continues to a virtual point "E". The procedure following virtual point "E" will be described later on.

In step 517 following step 511 in the negative case, a judgement is made as to whether or not undesired expression flag UEF is true (logical 1).

If the judgement in step 517 is affirmative, the process continues to virtual point "D" to unify with the affirmative branch of step 511, and proceed further to step 515. In other words, even if no alerting expression was detected in step 609, adaption of scanning rate and resolution in step 515 is executed anyway provided that an undesired expression has been detected in step 207.

If the judgement in step 517 is negative, the process continues to step 519 resetting the scanning rate and resolution of scanning device 114. Resetting means setting to the initial values. Then, the process continues to virtual point "E".

From point "E", procedures as described above are executed to complete the main loop of process 500. Namely, steps 217, 219 known from FIG. 2 are run through. In other words, image data is forwarded and, if communication has been terminated, the process is ended, otherwise branched to virtual point "A" so as to begin an new cycle of the main loop of process 500.

According to the present embodiment, a scanning resolution of sensor device 114 is increased only in areas where alerting expressions or undesired expressions are found. Instead the scanning resolution of sensor device 114 may be increased as a whole.

Figure 6:
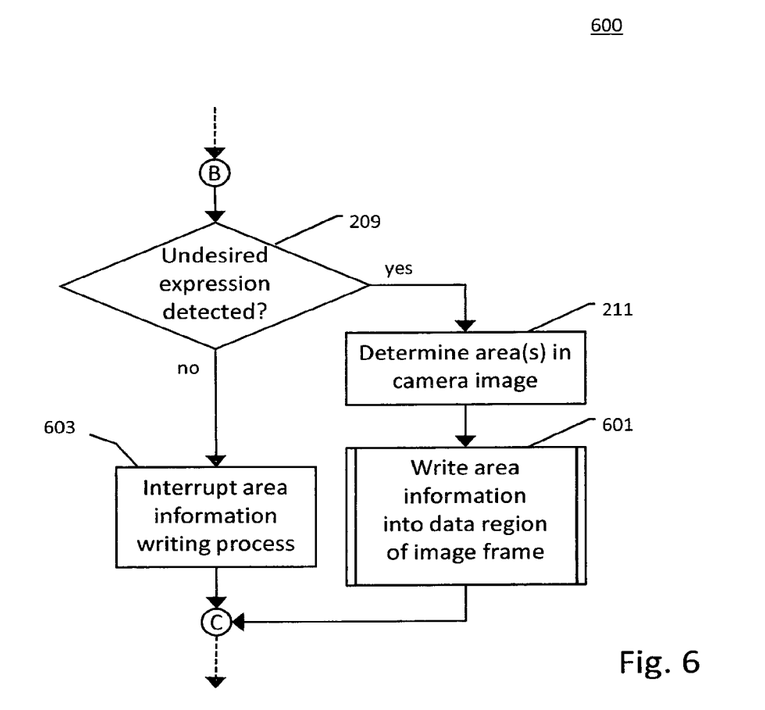
FIG. 6 shows a flow chart schematically illustrating a section of another process according to a further preferred embodiment.

FIG. 6 shows flow chart schematically illustrating a section of a process 600 according to a further preferred embodiment of the invention. Process 600 is similar to process 200 illustrated in FIG. 2 except for the section shown in FIG. 6, replacing the section between virtual points "B" and "C". As furthermore seen in FIG. 6, the process section between virtual points "B" and "C" in process 600 of the present embodiment is similar to the respective process section in process 200 shown in FIG. 2, except for step 601 replacing step 213.

In other words, according to the present embodiment, a process is executed as in FIG. 2, until virtual point "B". Also, in step 209 following virtual point "B", a decision is made whether or not undesired expressions have been identified, based on the result of the detection in preceding step 207 (FIG. 2). It the decision in step 209 is affirmative, the process goes to step 211, otherwise to step 603 to be described later.

In step 211 following 209 in the affirmative case, an area or several areas is/are determined which contain undesired body expressions as detected in step 207 (FIG. 2), in an image taken from webcam 112. For further explanation of this step 209, see the description thereof in the context of FIG. 2 above. Then, the process continues to step 601.

In step 601, area information is written into a data region of a video frame coming from webcam 112. Step 601 is a subroutine which is executed, for each image frame coming from webcam 112, until the routine shown in FIG. 6 comes to this point again with new areas returned from step 211, or to step 603 to be described later. Then, the process continues to virtual point "C" to unify with the negative branch of step 209.

In step 603 following step 209 in the negative case, which means that the process yields no areas returned from step 211, any running subroutine of writing area information into a data region of image frames (step 601) is interrupted. For ease of illustration, a judgment and branching as to whether said subroutine is running or not is understood to be included in step 603. Then, the process continues to virtual point "C" to continue with the remainder of the process as shown in FIG. 2, from that point.

It is to be noted that, according to the present embodiment, image contents of processed video data having been treated by step 601 of this process 600 are not yet changed but any image content, be it undesirable or not, is still contained, in full image resolution, in the processed video data. This means that a decision and treatment as to change of image contents may be executed, based on area information added in the data region of an image frame, by another instance. This enhances distributing the hiding or censoring procedure over different parts of a telecommunications setup such as telecommunications setup 102 in FIG. 1. It also enables that decision and treatment as to hiding detected undesired contents may be executed at the receiving side of a communication, enabling full control of information reception. Furthermore, the process 600 enables video being recorded and distributed with full uncensored contents, but including information enabling optional censoring on the playing side.

Figure 7:
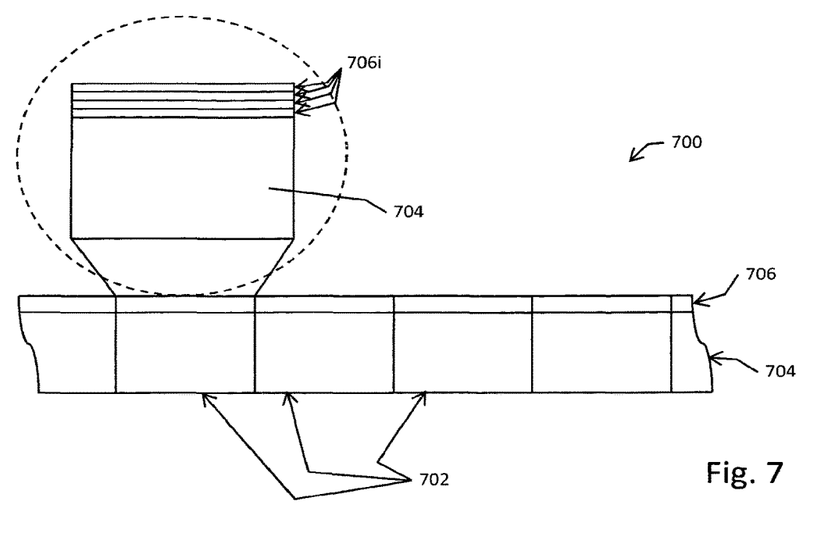
FIG. 7 schematically shows a video frame structure.

FIG. 7 schematically shows a video frame structure 700 suitable for use with the embodiment of FIG. 6. Frame structure 700 represents a video standard for use, e.g., with analog cathode ray tube (CRT) television receivers.

As seen in FIG. 7, frame structure 700 consists of a number of frames 702 continuously following each other. It is to be noted that only four frames 702 are shown in complete in FIG. 7 while numerous frames may precede and follow, two of which are shown cut-off in FIG. 7. One of the frames 702 is shown in more detail in an enlarged view encircled by a dashed line while it should be clear that any frame 702 of frame structure 700 exhibits this structure.

As is well-known in the art analog TV video data consists of a predefined number of rows being subsequently scanned by e.g. a cathode ray tube (CRT) of a TV screen. Transmission of video data may be accomplished sequentially (frame by frame) or interlacing (half-frame by half-frame with one half-frame consisting, e.g. of odd-row numbers while the other half-frame consists of equal-row numbers), or in similar manner. By technical reasons, only part of rows are used for image display while some rows are not displayed. Accordingly, frames 702 of frame structure 700 have an image region 704 and a blank region 706. The blank region 706 consists of undisplayed rows, symbolized by five individual undisplayed rows 706i shown in the enlarged part of FIG. 7.

According to a preferred embodiment, in the subroutine symbolized by step 601 in FIG. 6, area information is translated into image data which is written into undisplayed rows 706i. The blank region 706 is therefore a data region in the sense of the present invention. Furthermore, frame structure 700 is a data construct in the sense of the present invention and an embodiment of the invention per se.

Figure 8:
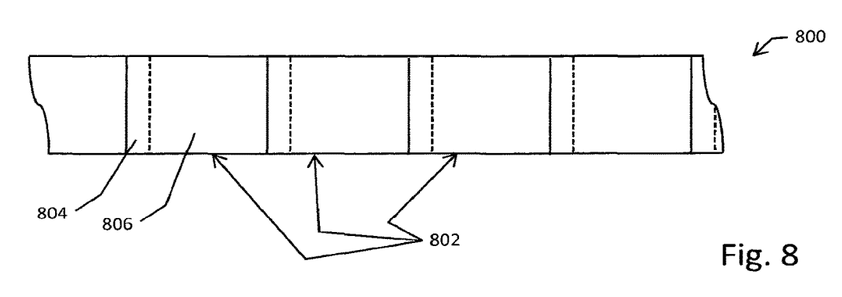
FIG. 8 schematically shows another video frame structure.

FIG. 8 schematically shows another video frame structure 800 suitable for use with the embodiment of FIG. 6. Frame structure 800 represents a video standard for use, e.g., with digital television receivers which may control, e.g., LCD or LED or Plasma displays. It is to be noted that a digital television receiver may be adapted to translate the digital data into analog image signals of a CRT screen as well.

As seen in FIG. 8, frame structure 800 consists of a number of frames 802 continuously following each other. It is to be noted that only four frames 802 are shown in complete in FIG. 8 while numerous frames may precede and follow, two of which are shown cut-off in FIG. 8.

According to FIG. 8, each frame 802 of frame structure 800 has a header part 804 and an image part 806. Image part 806 contains coordinate and colour data of each pixel displayable by an applied image standard. Header part 804 may contain additional data used for control or other purposes.

According to a preferred embodiment, subroutine symbolized as step 601 in FIG. 6, area information in the form of coordinate data of each image area containing undesired contents is written into header part 804. Header part 804 therefore a data region in the sense of the present invention. Furthermore, frame structure 800 is a data construct in the sense of the present invention and an embodiment of the invention per se.

Figure 9:
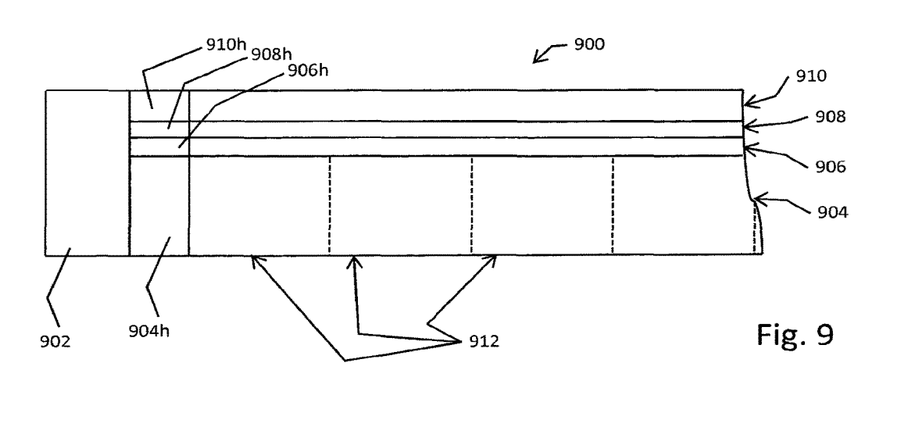
FIG. 9 schematically shows a data stream structure for video recording, playing and transmission, according to another preferred embodiment of the invention.

FIG. 9 schematically shows a data stream structure 900 for video recording and/or transmission, according to another preferred embodiment of the invention.

As seen in FIG. 9, data stream structure 900 includes a main header 902, and four streams 904, 906, 908, 910 following on main header 902. Main header 902 contains basic definitions of streams 904, 906 908, 910. In the present embodiment, stream 904 is a video stream, stream 906 is an audio stream, stream 908 is a text stream, and stream 910 is a censoring information stream.

Each one of streams 904, 906 908, 910 includes a stream header 904h, 908h, 908h, 910h containing specific definitions on each stream, respectively. Video stream 904 is for streaming image data which are provided by a series of frames 912. Image data is structured to have coordinate and colour data for each pixel of a frame. Audio stream 906 is for streaming audio data relating to video stream 904. Text stream 908 is for streaming text information such as, e.g., subtitles or other information relating to video stream 904. Censoring information stream 910 is for streaming e.g. area information where undesired contents are present. Furthermore, censoring information stream 910 may include age information representing a minimum age relating to each area information, telling an age a person must have to be allowed to watch contents of this image area. Furthermore, censoring information stream 910 may include country information linked with each age information, telling which age in which country a person must have to be confronted with contents of this image area. Streams 904, 906, 908, 910 may be transmitted, read and synchronized in ways similar to those known in the art such as, e.g., an AVI standard.

Instead of including age try information in censoring data stream 910, censoring data stream 910 may be subdivided into several streams containing censoring data applicable to a particular age and/or country.

As an alternative, censoring information may be encoded another stream such as, e.g., a text stream or an audio stream, to be decoded on a receiver's or player's side.

It is to be noted that the data stream structure 900 may not only be used in live streaming but also in a video recording standard.

By a data stream structure as described above, video information may be recorded and/or transmitted with full uncensored image data while giving a player or a receiving side of a communication or a playing side of a video product an opportunity of enabling or disabling or adjusting a censoring function, based on censoring information contained in said censoring information stream 910.

Video stream structure 900 is a data construct in the sense of the present invention.

Figure 10:
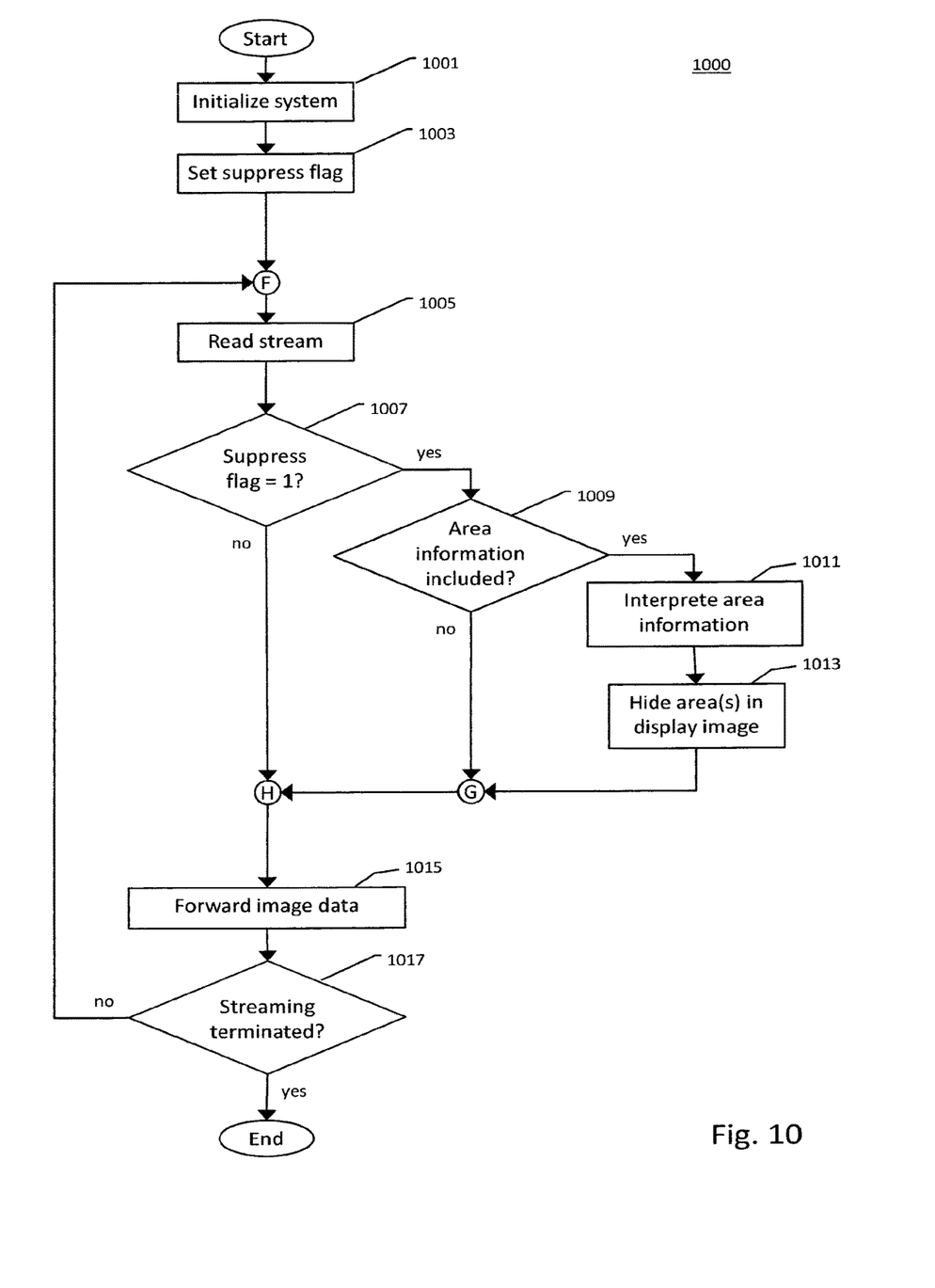
FIG. 10 shows a flow chart schematically illustrating another process according to a further preferred embodiment.

FIG. 10 shows a flow chart schematically illustrating another process 1000 according to a further preferred embodiment of the invention.

In step 1001, a video data handling system is initialised. The video data handling system may be a computer having software for interpreting live stream such as of a teleconference or movie live streaming, or for decoding recorded data like on DVD or other storage medium. The video data handling system may also be a video tape player or DVD player or Blu Ray disk player or the like of a HiFi or home cinema installation. The video data handling system may also be part of the telecommunications setup shown in FIG. 1. Then, the process continues to step 1003.

In step 1003, a suppress flag is set. Setting of a suppress flag in step 1003 may be done automatically or on user's choice. In other words, a user dialog may be provided asking a user whether or not suppressing (or censoring) undesired contents shall be applied. A user may also be asked to which age censoring shall be applied. A hardware or software switch may be provided for preselecting whether or not and/or an age to which a censoring of any video data shall be applied by the video data handling system. Then, the process continues to step 1005.

In step 1005, a data stream is read. Reading a data stream in step 1003 includes reading any part of a data structure or streaming structure used for video transmission or recording/playing, including not only a video stream but also other streams like audio, text, and additional data. In particular, video and any data providing censoring information is read in step 1005. Then, the process continues to a virtual point "F" further leading to step 1007. It is to be noted that virtual point "F" is a starting point of a main loop of process 1000.

In step 1007, it is judged whether or not a censoring flag is set true (logical 1). In case the judgement in step 1007 is affirmative, the process continues to step 1009, otherwise to a virtual point "H" in the flow chart.

In step 1009 following step 1007 in the affirmative case, it is judged whether not area information is included in the stream read in step 1005. In case the judgement in step 1009 is affirmative, the process continues to step 1011, otherwise to a virtual point "G" in the flow chart.

In step 1011 following step 1009 in the affirmative case, area information included in the stream is interpreted. Interpreting area information in step 1011 includes determining image areas which should be hidden by subsequent process steps. Then the process continues to step 1013.

In step 1013, areas determined in step 1011 are hidden. Hiding areas includes any means described above in the context of step 213 of process 200 (FIG. 2). Then, the process continues to virtual point "G" mentioned above to unify with the negative branch of step 1009, and further to virtual point "H" mentioned above, to unify with the negative branch of step 1007. From virtual point "H", the process continues to step 1015.

In step 1015, processed image data forwarded. It will be noted that image data read in step 1005 may be referred to as unprocessed image data while image data being treated by process 1000 may be referred to as processed image data, in the sense of the invention. Forwarding processed image data includes preparing each frame, with or without hidden areas, for further use by the video data postprocessing system, which may be, e.g., displaying on a video screen or sending via router 116 (FIG. 1) to another side of communication. Then, the process continues to step 1017.

In step 1017, it is judged whether or not streaming has ended. If the judgement is affirmative, the process ends. Otherwise, the process jumps back to the beginning of the main loop of process 1000 at virtual point "F".

As is apparent from the above description, process 1000 is useful for being used in decoding and displaying video data including censoring data, as well as for a two-stage process extension of process 200 shown in FIG. 2, enabling the two-stage process with a first process stage of detecting and marking undesired contents and a second process stag actually hiding undesired contents to be executed by different hardware components of a telecommunications setup as shown in FIG. 1.

The invention has been described above by means of several embodiments shown in the drawings. It is to be noted, however, the the invention is not limited to the shown and described embodiments with are to be taken as examples. The scope of the invention is defined by the appended claims in their most general meaning.

It s to be noted that webcam 112 according to the present embodiment is run by the telecommunications software, in parallel to control of the sensor device 114 by the sensor software. The motion and gesture recognition software may ail of the telecommunications software or the sensor software. However, other distribution of the process implementation over workstation 104, sensor device 114 and router 116 may be applied as needed.

In the present embodiments, motion and gesture recognition is accomplished by sensor device 114 provided apart from webcam 112 providing video data to be processed. It is advantageous if sensor device 114 is placed close to webcam 112 (or any other camera capturing the relevant video data) so as to facilitate conforming sensor coordinates to image coordinates. It is also possible to use RCD camera of sensor device 114 for providing video data to be processed.

The invention is not limited to the use of sensor devices of the Kinect brand. Devices of other brands or manufacturers may also be used instead of sensor device 114, or may be developed and/or adapted for a particular application, as long as they are suitable for motion and gesture recognition in the sense of the present invention. The motion and gesture recognition function may be implemented, by software or hardware, in a computer workstation, server, telecommunications device, or the like, instead of being integrated in sensor device 114. For the application of the present invention, a microphone is not necessarily needed but may be used for acoustic source localisation so as to locate persons. The system may be further developed to also mimic recognition so as to further enhance detection of undesired expressions.

The invention is not milted to the use of a workstation system, in particular, parts of the telecommunications setup 102 may be integrated such that for example, the computer core, drives, and interfaces, as well as webcam 112, may be integrally assembled with the monitor 106. A laptop computer, notebook, netbook, tablet PC, mobile phone, smart phone, or any other telecommunications and computing device may be used as well.

The invention claimed is:

1. A video data processing device comprising:
a processor, a non-transitory computer readable medium communicatively connected to the processor, and at least one sensor device communicatively connected to at least one of the processor and the non-transitory computer readable medium, the at least one sensor device configured to collect information relating to motions and gestures of at least one object;
the video data processing device configured to identify undesirable image contents contained in first video data based on a result of motion and gesture recognition that is based on the information relating to motions and gestures obtained via the at least one sensor device, said undesirable image contents including inappropriate body expression and provide content information relating to any identified undesirable image contents;
the video data processing device configured to identify indicators in a situation or scene recorded in the first video data that increase the likelihood of undesirable image contents to be contained in said first video data in the future based on recognized motions and gestures and set an alert state for the at least one sensor device in which a scanning rate for the at least one sensor device is increased and/or a scanning resolution of the at least one sensor device is increased in response to detection of the indicators.

2. The video data processing device of claim 1, wherein the video data processing device is configured to adapt the at least one sensor in response to identifying the indicators in the situation or scene that increase the likelihood of undesirable image contents to be contained in said first video data in the future such that the scanning rate is increased and the scanning resolution is increased at least in an image section in which an obscene gesture or indecent exposure is expected.

3. The video data processing device of claim 2 and wherein the video data processing device is configured to adapt the at least one sensor in response to identifying the indicators in the situation or scene that increase the likelihood of undesirable image contents to be contained in said first video data in the future such that a data processing cycle for motion and gesture recognition is accelerated.

4. The video data processing device of claim 1, wherein the video data processing device is configured to adapt the at least one sensor in response to identifying the indicators in the situation or scene that increase the likelihood of undesirable image contents to be contained in said first video data in the future such that a data processing cycle for motion and gesture recognition is accelerated.

5. The video data processing device of claim 1, wherein the video data processing device is configured to utilize the at least one sensor to scan said situation or scene within a scanning field of the sensor device, identify persons in said scanning field, and decide whether or not at least one of a person in said scanning field is performing an inappropriate body expression based on said recognized motions and gestures.

6. The video data processing device of claim 1, wherein the video data processing device is configured to suppress said identified undesired image contents in processed video data.

7. The video data processing device of claim 1, wherein said content information comprises area information on image areas including said identified undesired contents.

8. The video data processing device of claim 1, wherein said video data processing device is configured to include said content information in at least one member of the group consisting of a data region such as a header of each video frame, surplus lines of each video frame, and a data stream apart from a video stream.

9. The video data processing device of claim 1, wherein said content information comprises at least one member of the group consisting of:
a flag indicating that undesirable image contents are contained in a frame,
an area counter including a number of identified areas in said frame, and
an end-of-areas flag indicating that said area information is finished.

10. The video data processing device of claim 1, wherein said content information comprises a continue flag indicating that undesirable image contents of a previous frame continue to be present in a presently processed frame.

11. The video data processing device of claim 1, comprising a camera to record the first video data, wherein the camera is communicatively connected to at least one of the processor and the non-transitory computer readable medium.

12. The video data processing device of claim 11, wherein the video data processing device is one of a video communication device, a video recording device, and a video playing device.

13. A non-transitory computer readable medium comprising data stored thereon that is executable by a video data processing device, the data stored in the computer readable medium defining a method that is performed by the video data processing device when the video data processing device executes the data, the method comprising:
processing first video data into processed video data, said first video data being provided by picking up sequential images of a situation or scene,
applying a motion and gesture recognition to said situation or scene;
identifying undesirable image contents contained in said first video data based on a result of said motion and gesture recognition, said undesirable image contents including inappropriate body expression and providing content information relating to any identified undesirable image contents;
producing said processed video data using said content information relating to any identified undesirable image contents;
identifying indicators in said situation or scene that increase the likelihood of undesirable image contents to be contained in said first video data in the future, based on recognized motions and gestures, and providing information on said indicators; and
adapting said motion and gesture recognition by using information on said identified indicators, wherein said adapting includes setting an alert state in which a scanning rate is increased and a scanning resolution is increased at least in an image section in which an obscene gesture or indecent exposure is expected and wherein a data processing cycle for motion and gesture recognition is accelerated.

14. The non-transitory computer readable medium of claim 13, wherein the method also comprises:
scanning said situation or scene within a scanning field of a sensor device;
identifying persons in said scanning field; and
deciding whether or not at least one of a person in said scanning field is performing an inappropriate body expression, based on said recognized motions and gestures.

15. The non-transitory computer readable medium of claim 13, wherein the method also comprises:
suppressing said identified undesired contents in said processed video data.

16. The non-transitory computer readable medium of claim 15, wherein said content information comprises area information on image areas including said identified undesired contents and wherein said suppressing step includes making said image areas unrecognizable in a frame, based on said area information.

17. A non-transitory computer readable medium comprising data stored thereon that is executable by a video data processing device, the data stored in the computer readable medium defining a method that is performed by the video data processing device when the video data processing device executes the data, the method comprising:
receiving first video data from a camera recording sequential images of a situation or scene;
scanning said situation or scene via a sensor device to detect motion of at least one person in the scanning field;
identifying indicators in said situation or scene that increase the likelihood of undesirable image content being contained in said first video data based on recognized motions and gestures from the scanning and providing information based on said indicators;
increasing a scanning rate of the scanning performed via the sensor device based on said information based on said indicators;
detecting motion of the at least one person from the scanning corresponding to at least one undesirable expression motion data stored in non-transitory memory, said undesirable expression motion data including data identifying inappropriate body expressions;
identifying at least one undesirable image content contained in said first video data based on the detecting of the motion of the at least one person corresponding to the at least one undesirable expression motion data;
providing content information relating to the at least one identified undesirable image content; and
producing said second video data from the first video data using said content information relating to the at least one identified undesirable image content to prevent a display of the at least one identified undesirable image content.

18. The non-transitory computer readable medium of claim 17, wherein the method also comprises:

increasing resolution of the scanning performed via the sensor device based on said information based on said indicators.

19. The non-transitory computer readable medium of claim 17, wherein the providing of content information relating to the at least one identified undesirable image content comprises:

communicating information about at least one portion of the scanning field that has the detected motion corresponding to the at least one undesirable expression motion.

20. The non-transitory computer readable medium claim 19, wherein:

the communicating of the information about the at least one portion of the scanning field comprises storing field coordinates in a database stored in non-transitory memory; and wherein the producing of said processed second video data comprises accessing the database to use the stored field coordinates to process the first video data into the second video data.

\* \* \* \* \*